US008984307B2

(12) United States Patent
Stewart

(10) Patent No.: US 8,984,307 B2
(45) Date of Patent: Mar. 17, 2015

(54) SYSTEM AND METHOD FOR DYNAMIC BATTERY CURRENT LOAD MANAGEMENT IN A PORTABLE COMPUTING DEVICE

(75) Inventor: Richard A. Stewart, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 13/476,293

(22) Filed: May 21, 2012

(65) Prior Publication Data

US 2013/0311794 A1 Nov. 21, 2013

(51) Int. Cl.

*G06F 1/00* (2006.01)
*G06F 1/26* (2006.01)
*H04W 52/02* (2009.01)
*G06F 1/32* (2006.01)

(52) U.S. Cl.

CPC ............. *G06F 1/26* (2013.01); *H04W 52/0264* (2013.01); *G06F 1/3212* (2013.01); *Y02B 60/50* (2013.01)

USPC .......................................................... 713/300

(58) Field of Classification Search

CPC .... G06F 1/26; G06F 1/3212; H04W 52/0264; Y02B 60/50

USPC .......................................................... 713/300

See application file for complete search history.

(56) References Cited

U.S. PATENT DOCUMENTS 5,455,499 A 10/1995 Uskali et al.
5,633,573 A 5/1997 van Phuoc et al.
5,838,139 A 11/1998 Greene
6,046,574 A 4/2000 Baranowski et al.
6,463,305 B1 10/2002 Crane
6,564,328 B1 * 5/2003 Grochowski et al. ......... 713/320
7,779,276 B2 * 8/2010 Bolan et al. .................. 713/300
2004/0041538 A1 3/2004 Sklovsky
2008/0200220 A1 8/2008 Jackson
2012/0047379 A1 2/2012 Chen et al.
2012/0210150 A1 * 8/2012 de Lind van Wijngaarden et al. ............................ 713/320

FOREIGN PATENT DOCUMENTS

WO 2008101251 8/2008

OTHER PUBLICATIONS

International Search Report and Written Opinion—PCT/US2013/039388—ISA/EPO—Jul. 16, 2013.

* cited by examiner

*Primary Examiner* — Mark Connolly
(74) *Attorney, Agent, or Firm* — Nicholas A. Cole

(57) ABSTRACT

Various embodiments of methods and systems for managing battery capacity in a portable computing device ("PCD") are disclosed. One such method includes leveraging a request/grant algorithm that receives a request from an offline component to come online. If battery capacity is available to accommodate the offline component, the request is granted. If battery capacity is not available to accommodate the offline component, the request is authorized at a reduced power level or capacity is created by reducing power to online components. Another method polls a battery to monitor demand on its capacity by active components. Offline components likely to come online concurrently with the active components are identified and ranked based on power consumption. A target current margin is adjusted based on the highest power consumption associated with an identified block of offline components.

8 Claims, 7 Drawing Sheets

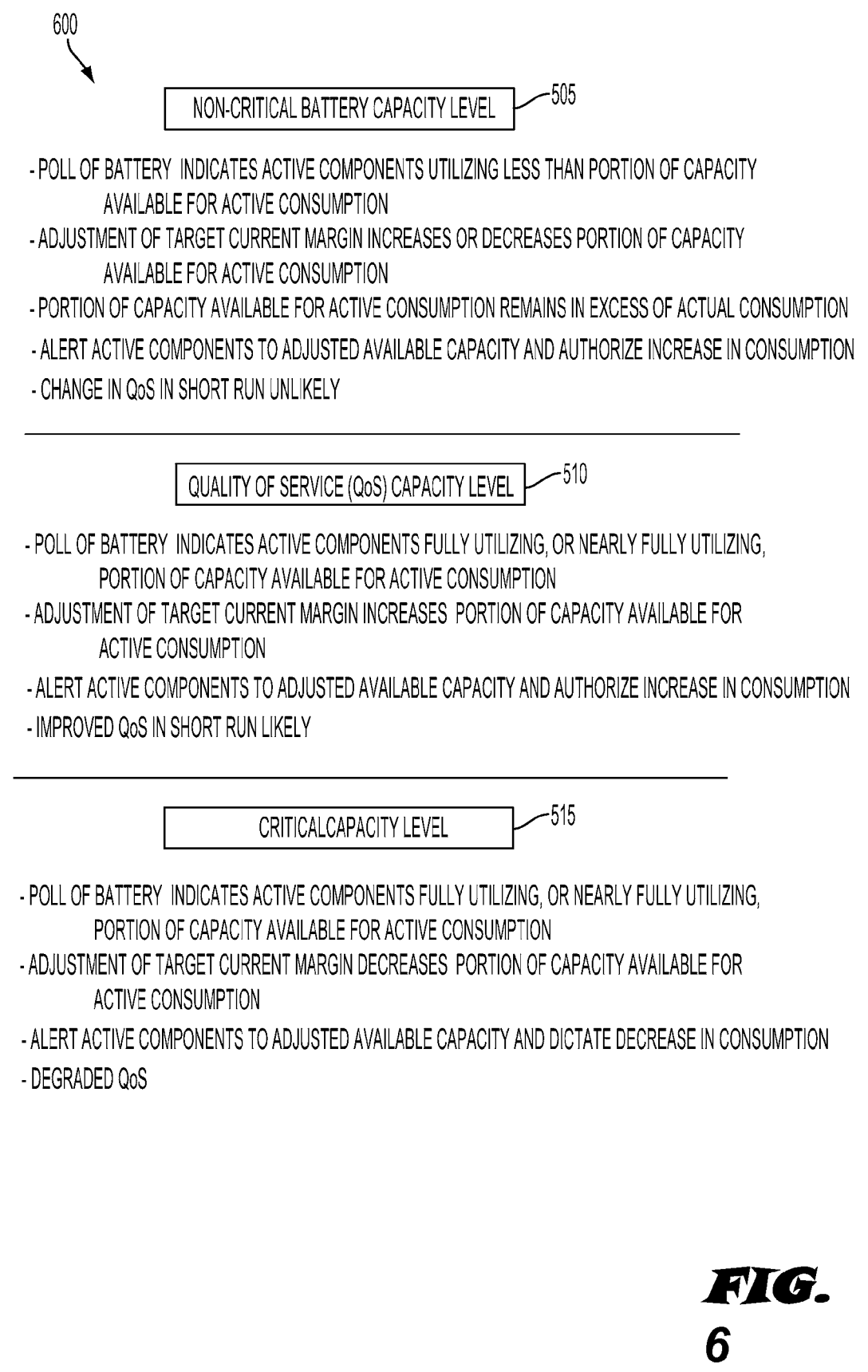

600

NON-CRITICAL BATTERY CAPACITY LEVEL 505

- POLL OF BATTERY INDICATES ACTIVE COMPONENTS UTILIZING LESS THAN PORTION OF CAPACITY AVAILABLE FOR ACTIVE CONSUMPTION
- ADJUSTMENT OF TARGET CURRENT MARGIN INCREASES OR DECREASES PORTION OF CAPACITY AVAILABLE FOR ACTIVE CONSUMPTION
- PORTION OF CAPACITY AVAILABLE FOR ACTIVE CONSUMPTION REMAINS IN EXCESS OF ACTUAL CONSUMPTION
- ALERT ACTIVE COMPONENTS TO ADJUSTED AVAILABLE CAPACITY AND AUTHORIZE INCREASE IN CONSUMPTION
- CHANGE IN QoS IN SHORT RUN UNLIKELY

---

QUALITY OF SERVICE (QoS) CAPACITY LEVEL 510

- POLL OF BATTERY INDICATES ACTIVE COMPONENTS FULLY UTILIZING, OR NEARLY FULLY UTILIZING, PORTION OF CAPACITY AVAILABLE FOR ACTIVE CONSUMPTION
- ADJUSTMENT OF TARGET CURRENT MARGIN INCREASES PORTION OF CAPACITY AVAILABLE FOR ACTIVE CONSUMPTION
- ALERT ACTIVE COMPONENTS TO ADJUSTED AVAILABLE CAPACITY AND AUTHORIZE INCREASE IN CONSUMPTION
- IMPROVED QoS IN SHORT RUN LIKELY

---

CRITICALCAPACITY LEVEL 515

- POLL OF BATTERY INDICATES ACTIVE COMPONENTS FULLY UTILIZING, OR NEARLY FULLY UTILIZING, PORTION OF CAPACITY AVAILABLE FOR ACTIVE CONSUMPTION
- ADJUSTMENT OF TARGET CURRENT MARGIN DECREASES PORTION OF CAPACITY AVAILABLE FOR ACTIVE CONSUMPTION
- ALERT ACTIVE COMPONENTS TO ADJUSTED AVAILABLE CAPACITY AND DICTATE DECREASE IN CONSUMPTION
- DEGRADED QoS

FIG. 6

SYSTEM AND METHOD FOR DYNAMIC BATTERY CURRENT LOAD MANAGEMENT IN A PORTABLE COMPUTING DEVICE

DESCRIPTION OF THE RELATED ART

Portable computing devices ("PCDs") are powerful devices that are becoming necessities for people on personal and professional levels. Examples of PCDs may include cellular telephones, portable digital assistants ("PDAs"), portable game consoles, palmtop computers, and other portable electronic devices.

As users have become more and more reliant on PCDs, demand has increased for more and better functionality. Simultaneously, users have also expected that the quality of service ("QoS") and overall user experience not suffer due to the addition of more and better functionality. Paradoxically, providing more and better functionality in PCDs without sacrificing QoS and user experience necessitates higher and higher milliamp hours ("mA-Hr") of battery capacity.

Generally, providing more mA-Hr of battery capacity in a PCD simply means including a larger battery. However, the trend in PCD design is for smaller form factors which often preclude the inclusion of a larger battery. Moreover, because the mA-Hr density of available battery technology has stagnated, the inclusion of a higher power density battery in a given size is no longer the answer to support the additional functionality. Rather, to accommodate the additional functionality in today's PCDs, the limited amount of available battery capacity must be managed such that it is leveraged efficiently and user experience is optimized.

One solution for managing battery capacity is to predefine a fixed safety margin of capacity. Instantaneous loads on the battery are monitored and various load management policies are implemented to mitigate instances of encroachment on the safety margin. The goal in seeking to maintain a certain amount of safety margin, or capacity headroom, is so that additional calls for functionality by the user of the PCD can be accommodated.

Predetermining the amount of fixed safety margin is an exercise in weighing tradeoffs. Larger battery capacity safety margins effectively reduce the peak load capacity in the PCD in favor of maintaining a generous power reserve, thereby mitigating the probability of system brownout or crash but sacrificing the amount of functionality available to the user at any given time. Narrower battery capacity safety margins earmark battery capacity available to provide functionality to the user of the PCD but increase the probability that a current spike or a requirement to provide a continuous current that goes beyond the capability of the system will result in a brownout or reboot of the PCD. More simply put, choosing a fixed battery capacity margin requires weighing the probability of browning or crashing the system against the detrimental effect on user experience that could result from reduced PCD functionality.

Therefore, there is a need in the art for a system and method that manages available battery capacity such that PCD functionality is optimized. More specifically, there is a need in the art for a system and method that manages battery demand in a PCD by dynamically adjusting battery capacity safety margins so that resource availability in a PCD is optimized without a significant increase in the risk of brownout.

SUMMARY OF THE DISCLOSURE

Various embodiments of methods and systems for managing battery capacity in a portable computing device ("PCD") are disclosed. Exemplary embodiments include a battery current limiting ("BCL") module configured to leverage request/grant methodologies. An exemplary BCL module that implements an exemplary request/grant methodology seeks to periodically poll a battery in the PCD to determine an active demand on its capacity that is the result of one or more online components within the PCD. The BCL module receives requests from one or more offline components within the PCD to which are seeking to come online. Before authorizing the requesting offline components to come online, the BCL module may query a database to identify a power consumption level associated with the one or more requesting components and use the power consumption level to predict the probable impact on battery capacity if the offline components are allowed to come online. If a target current margin representing a portion of the battery capacity held in reserve would be encroached by the additional capacity burden, the BCL module may deny the request. Alternatively, the BCL module may authorize the requesting offline components to come online at a reduced power level or instruct active, online components to reduce power consumption in order to create enough battery capacity that the request of the offline components can be accommodated.

Other exemplary embodiments include a BCL module configured to leverage reactive loop methodologies. An exemplary BCL module that implements an exemplary reactive loop methodology seeks to poll a battery in the PCD to determine an active demand on its capacity relative to a target current margin that represents a portion of the battery capacity held in reserve. The BCL module may query a database to identify an iWORST block of one or more offline components. Identification of the iWORST block of offline components is based on the power consumption associated with the offline block of components and the likelihood that the block could be brought online concurrently with one or more online components. The power consumption associated with the iWORST block is compared to the target current margin. If the iWORST power consumption exceeds the target current margin, then the target current margin is expanded to ensure that power capacity is available in the event that the iWORST block is called online. If the iWORSt power consumption is less than the target current margin, then the target current margin is reduced such that the amount of power capacity available to online components is optimized. In this way, the target current margin is dynamically managed such that the available power capacity is efficiently allocated to optimize QoS and user experience.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 6 is a diagram illustrating exemplary battery capacity management techniques that may be applied to optimize QoS and overall user experience and are dependent upon a particular battery capacity level of a PCD.

DETAILED DESCRIPTION

Figure 1:
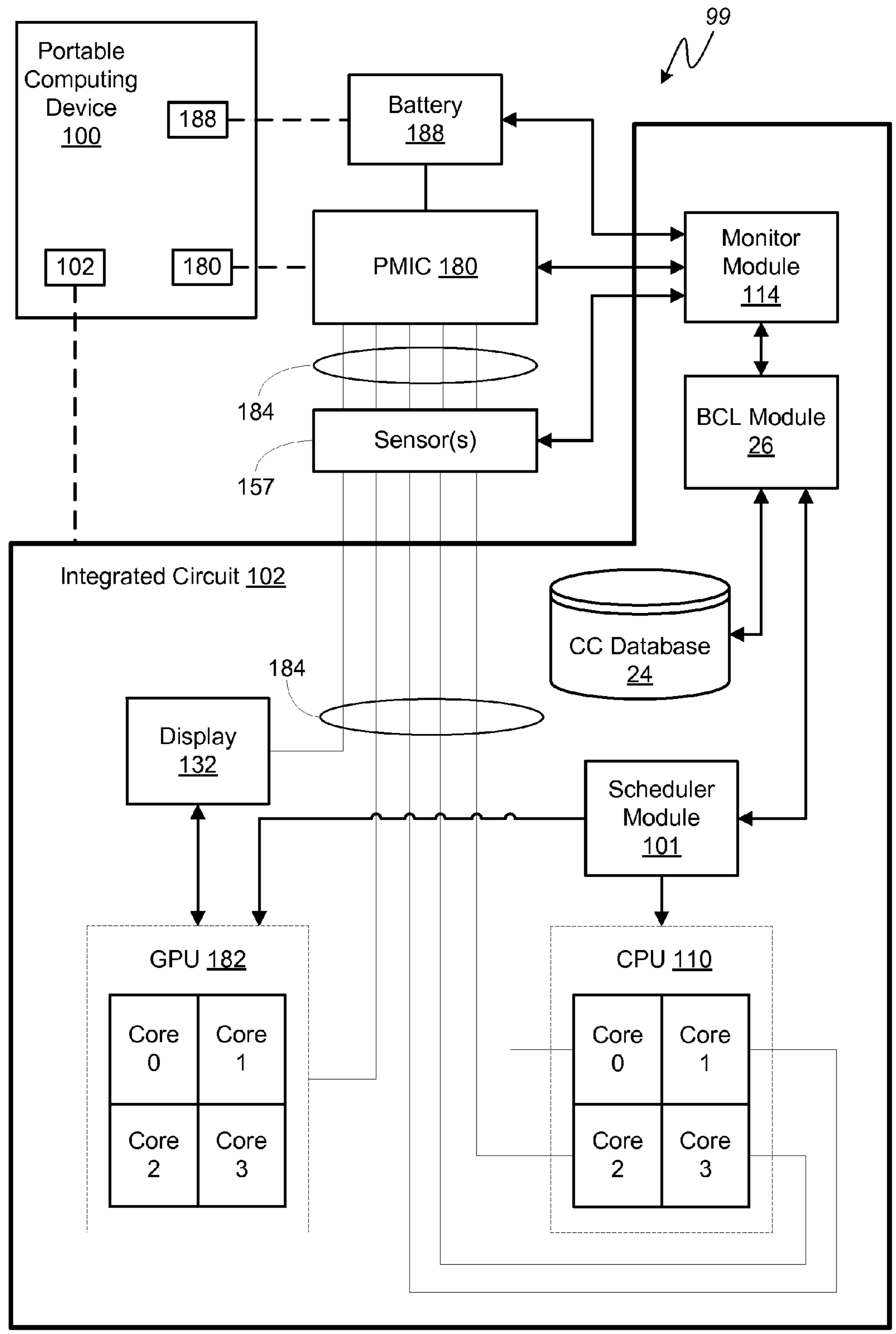
FIG. 1 is a functional block diagram illustrating an exemplary embodiment of a system for dynamically managing battery capacity in a portable computing device ("PCD") to optimize Quality of Service ("QoS") and overall user experience.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," and "chip" are used interchangeably. Moreover, a CPU, DSP, or a chip may be comprised of one or more distinct processing components generally referred to herein as "core(s)."

In this description, the term "call" refers to a request for additional resources and/or functionality in a PCD over and above that which may be running at the time of the call. As such, one of ordinary skill in the art will understand that a call may be the result of a PCD user requesting the PCD to perform some function, provide some service, generate and render some deliverable or the like. Moreover, one of ordinary skill in the art will also understand that a call for a PCD resource may be the result of a given component within the PCD leveraging another component within the PCD to complete a workload task. As a non-limiting example, a user action to open a browser application on a PCD may cause calls for additional resources/components in the PCD not in use at the time of the call such as a modem, a graphical processor and/or a display. One of ordinary skill in the art will understand that allowing a call for a component or resource may increase battery demand within a PCD.

In this description, the terms "workload," "process load" and "process workload" are used interchangeably and generally directed toward the processing burden, or percentage of processing burden, associated with a given processing component in a given embodiment. Further to that which is defined above, a "processing component" may be, but is not limited to, a central processing unit, a graphical processing unit, a core, a main core, a sub-core, a processing area, a hardware engine, etc. or any component residing within, or external to, an integrated circuit within a portable computing device.

In this description, the term "capacity management" and the like generally refers to measures and/or techniques for optimizing battery life and performance in a PCD. It is an advantage of various embodiments that the active and historical loads on a battery may be monitored, predicted and leveraged by capacity management techniques to prolong battery life, maintain availability of critical services, optimize user experience and provide higher levels of quality of service. To this extent, the terms "battery capacity," "capacity" and the like, as used in this description, will be understood by one of ordinary skill in the art to broadly encompass the measure of any parameter related to a battery's performance such as, but not limited to, the battery's ability to accommodate an instantaneous current provision, a sustained current provision, a voltage demand, etc., even though certain exemplary embodiments described herein may refer to the measurement of a specific parameter for illustrative purposes. Consequently, a battery's capacity may be quantified in terms of parameters such as, but not limited to, its charge level, voltage level, current supply rate, etc. and, as such, reference to "polling" a battery will be understood to envision a measure of any parameter used by a given embodiment to measure a battery's relative ability to accommodate a given demand on the battery. Moreover, one of ordinary skill in the art will understand that the term "demand," as used in this description envisions the quantification of any load on a battery that can be measured via one or more of the battery-related parameters outlined above.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, a notebook computer, an ultrabook computer, a tablet personal computer ("PC"), among others.

Exemplary methods and systems generally referred to herein as including battery current limiting ("BCL") module(s) seek to monitor and analyze the availability of battery capacity in a PCD. A BCL module, perhaps in conjunction with a monitoring module, seeks to monitor and manage the availability of a "current margin" or "current headroom" in the battery in an effort to ensure that adequate capacity is available for bringing offline resources within the PCD online. By monitoring the current headroom in the battery and implementing policies that cause the headroom to be replenished if it is encroached, BCL modules may insure the ability to bring additional resources online without causing the battery voltage to drop below a critical level (voltage drop in a battery is related to the level of current draw). As one of ordinary skill in the art recognizes, reaching a critical voltage level in the battery may cause brownout of active resources or even necessitate an automatic reboot of the PCD.

Notably, by maintaining a relatively larger current margin, some BCL modules may effectively reduce the amount of battery capacity available to online resources in favor of maintaining a cushion in case an additional resource is called. Conversely, other BCL modules that seek to maintain thinner current margins in favor of maximizing power capacity available to resources already online inherently run the risk of hardware resets (i.e., "brownouts") or even forced reboot of the PCD.

Systems for managing battery current margin leverage either "reactive loop" methodologies or "request/grant" methodologies. A reactive loop methodology leverages periodic polling of the battery to determine the actual amount of capacity headroom available to accommodate additional functionality in the PCD. A request/grant methodology receives requests from offline components to come online and authorizes the request, or authorizes a modification of the request, based on available battery capacity.

Reactive Loop Methodologies

Embodiments of a BCL system that use reactive loop methodologies periodically poll the state of the battery to identify its capacity, as may be measured in units of current drop, voltage drop, etc. In some reactive loop embodiments, it is envisioned that the battery itself may issue an interrupt to announce a change in capacity (relative to some delta versus its last report, and possibly incorporating some hysteresis) rather than the BCL algorithm polling the battery periodically for its capacity.

Based on a poll of the available capacity, a BCL module may trigger any number of capacity management techniques including, but not limited to, alerting active components within the PCD of an updated battery capacity level or implementing a change in component configuration to consume more or less power and provide better or lesser performance. Essentially, a BCL module running a reactive loop algorithm may instruct or authorize active components to increase or decrease processing speeds based on the current headroom targeted in the battery. Notably, in a PCD that includes a reactive loop BCL system, the current margin may be encroached for a period of time until the battery is next polled and further capacity management techniques implemented. In some embodiments, the BCL system may continuously monitor current on the buses supplying power to the components, anticipate a spike in the current draw and then react even though the headroom margin hasn't yet been encroached.

Some embodiments of a BCL system that use reactive loop methodologies poll the battery and then alert active components to a capacity level in the battery resources. The individual components leverage the capacity level as an input to their local DCVS algorithm. The components are given a battery capacity level, as may have been determined by the BCL module with reference to a target current headroom, and the BCL client on each component works with its local DCVS algorithm to adjust the power consumption of the component. Notably, in such embodiments of a BCL system, the capacity level published by the BCL module may be adjusted periodically based on the polling periods.

A BCL methodology that includes a reactive loop algorithm may employ the following formula: If the active current draw on the battery ("iBAT") exceeds the maximum potential load ("Lmax") on the battery minus a target current margin ("Mtarget"), then the current margin has been encroached upon and capacity management policies are implemented. [iBAT>=Lmax−Mtarget] Notably, if the target current margin is too low, then the brown out risk of the PCD may be too high. Conversely, if the target current margin is too high, then some PCD functionality, or combination of functionalities, may not be available to the user. As would be understood by one of ordinary skill in the art, Lmax (and, consequently Mtarget) may be set and scaled based on both temperature and overall charge level of the battery. Moreover, as a battery discharges, its maximum current delivery rate may decrease, thus effecting logical set points for Lmax.

Embodiments of BCL methodologies that include a reactive loop algorithm may leverage a dynamic current margin. A BCL methodology that includes a dynamic current margin may employ the following formula: If the active draw on the battery exceeds the maximum potential load on the battery minus a load associated with the largest potential power consuming block of components not currently online ("iWORST") in the PCD, then the dynamic current margin has been encroached upon and capacity management policies are implemented. [iBAT>=Lmax−iWORST]. Notably, while a reactive loop algorithm with a dynamic current margin reduces risk of brownout relative to a reactive loop algorithm with a static current margin, it may operate to unnecessarily guarantee current margin to accommodate nonsensical use cases associated with the largest potential power consuming block of components.

Accordingly, it is envisioned that further embodiments of BCL methodologies that include a reactive loop algorithm may leverage a dynamic current margin that is based on the largest power consuming component block that is offline and could realistically come online, as opposed to simply being based on the largest power consuming block offline. To determine the iWORST block by filtering the offline components based on which block could realistically come online, a BCL module may evaluate the offline components in light of the active components. For example, in the event that only a single display component is connected, a BCL module may eliminate a second offline display driver as being the iWORST component. As another non-limiting example, in the event that a PCD is in airplane mode, a BCL module may eliminate a long term evolution ("LTE") modem as being the iWORST component because no use case of a PCD in airplane mode would necessitate use of an LTE modem. Similarly, the iWORST component block may be determined by eliminating from consideration disallowed concurrencies. An exemplary disallowed concurrency may include turning on every transmitter in the PCD such that the system becomes out of compliance with a federal regulation.

Essentially, a BCL methodology that adjusts the target current margin based on the largest offline power consuming component that could realistically come online determines the iWORST block by evaluating potential concurrencies. That is, the current margin is adjusted based on the largest identified power consuming block that includes active and inactive components (notably, it is envisioned that one or more inactive components may be included in an identified power consuming block). As such, if the inactive component(s) in the identified iWORST block aren't associated with high power consumption, the target current margin may be dynamically adjusted such that more capacity is made available to active components. Moreover, as one of ordinary skill in the art will recognize, embodiments that include relatively more accurate determination of legitimate concurrencies when deducing the iWORST component block will reduce the likelihood of brownout while optimizing QoS and user experience.

It is envisioned that in some embodiments the dynamic current margin may be subject to a current reserve, i.e. a minimum, hard coded amount of current headroom that represents a safety margin of battery capacity ineligible for dynamic adjustment. For example, even in embodiments that seek to dynamically adjust the current margin to optimize the power capacity available to active components, it may be dictated that a minimum amount of current margin required to power critical services is always available.

Request/Grant Methodologies

Embodiments of a BCL system that use request/grant ("R/G") methodologies receive requests from offline components within a PCD seeking to come online and then authorize or deny the requests based on the capacity of the battery, as may be measured in units of current drop, voltage drop, etc. Notably, unlike many embodiments that use reactive loop methodologies to identify capacity levels for triggering capacity management policies at the individual active components, embodiments that use R/G methodologies dictate capacity management policies at the time of request. That is, in an embodiment that leverages an R/G algorithm, the power management decisions are made at a common BCL module, as opposed to the reactive loop embodiments which distribute the power management authority to the BCL clients associated with the individual components. Advantageously, embodiments that use R/G methodologies do not necessarily have to deduce an iWORST component block in order to dynamically manage current margin in the battery because requests from offline components to come online are evaluated individually at the time of request.

A BCL methodology that includes an R/G methodology for managing the power capacity of a battery relative to a target current margin may receive a request from the driver of an offline component block to authorize the offline component block to come online. The BCL module may grant or deny the request based on a comparison of the available current margin with the power consumption associated with the offline component block ("CBpower"). [grant request if Mtarget>=CBpower].

Exemplary embodiments that leverage R/G methodologies for managing current margin in a PCD battery receive a request from an offline component to come online. The BCL module identifies the available power capacity relative to a target current margin and, if allowing the component to come online would not cause the target margin to be encroached, the BCL module may authorize the component to come online. In the event that allowing the requesting component to come online would cause the current margin to be encroached, the BCL module may: 1) decline authorization for the requesting component to come online, or 2) authorize the requesting component to come online at a reduced power level associated with a load that would not cause the current margin to be encroached, or 3) generate capacity by instructing active components to reduce power consumption, or 4) apply a combination of generating capacity by reducing power consumption of active components and authorizing the requesting component to come online at a reduced power level.

In some embodiments that leverage an R/G methodology for managing battery capacity, the BCL module may recognize the availability of excess battery capacity beyond the desired current margin and proactively authorize active blocks of components to increase power consumption. Advantageously, by recognizing the existence of unused battery capacity, the BCL module may improve or optimize QoS and user experience by authorizing active components to process workloads at higher speeds.

Notably, in such embodiments that are configured to recognize excess power capacity, the BCL module may authorize active components to increase power consumption but may not necessarily dictate that the components do so. For example, it is envisioned that the individual components may or may not take advantage of the increased capacity as other factors driving their individual DCVS algorithm (a thermal policy, for example) may necessitate that power consumption remain at a relatively lower level. As such, it is envisioned that some embodiments that include R/G methodologies for authorizing requesting components to come online based on an instantaneous determination of battery capacity may also include a polling aspect for monitoring and updating the battery capacity state during periods between requests. Advantageously, by continuously monitoring battery capacity, global authorizations for active components to increase power consumption may be updated as one or more active components take advantage of the authorizations to adjust power consumption and one or more requesting components are authorized to come online.

In general, an exemplary BCL module, in seeking to manage battery capacity relative to a target current margin, may perform any one or more of the following functions including, but not limited to, reviewing real-time battery discharge for power profiling loads, predicting battery life and chronicling battery use, enabling optimum context-aware battery operation, monitoring SOV/state of charge ("SOC")/SOH parameters, monitoring use cases and documenting associated battery load, establishing concurrency QoS/user experience across various software and/or hardware, prolonging battery-life to maximize PCD platform availability, preserving resources within a PCD for mission-critical services, managing battery depth-of-discharge, managing battery SOH to prevent damage to the battery, maximizing cycle life of the battery, and enhancing PCD platform controllability, reliability, and security.

To prevent excessive battery voltage drop, embodiments of a BCL module may allow calls to launch or activate new software applications or hardware devices coupled to or existing within the PCD only if the combined instantaneous battery load is expected not to encroach a target current margin in the battery. Similarly, to prevent thermal related anomalies, for new applications that are to be launched or existing hardware to be activated, a BCL module may work with a thermal policy manager ("TPM") module to leave the aggregate platform load of the PCD intact only when platform thermal load of the PCD is expected to remain at a safe level. Otherwise, embodiments of a BCL module may negotiate reduced performance (including dismissal) for both existing applications and new application(s) queued for launch.

Certain embodiments of BCL modules leverage databases to query, update and maintain power consumption information associated with various components of a PCD as well as concurrency data indicative of logical combinations of components that may be active at any given point in time. The data may be used by a given BCL module to determine the probable affect on battery capacity should a requesting component be allowed to come online at a given processing speed. Similarly, other embodiments of a BCL module may use the data to identify an iWORST component block and adjust a target current margin accordingly. Based on data queried from a database, a BCL module may intelligently decide whether a given application should be born, scaled, or killed.

FIG. 1 is a functional block diagram illustrating an exemplary embodiment of a system 99 for managing battery capacity in a portable computing device ("PCD") 100. The BCL module 26 may leverage knowledge of individual power consumption profiles associated with various components in the PCD 100 to manage battery capacity and maintain a current margin to accommodate critical functionality. Consequently, the quality of service ("QoS") experienced by the user of a PCD 100 may be optimized as current margin is adjusted such that battery capacity available to active components is maximized.

As can be seen in the exemplary illustration of FIG. 1, a power management integrated circuit ("PMIC") 180 is configured to supply power to each of one or more exemplary processing components 110, 132, 182 residing within the integrated circuit 102. As depicted, the power is sourced from the battery 188 and distributed by the PMIC 180 to each of the processing components 110, 132 182 via a number of dedicated power rails 184. Notably, in the FIG. 1 illustration, display 132 and graphical processing unit ("GPU") 182 are each depicted as having a single, associated power supply rail 184 while each of cores 0, 1, 2 and 3 of central processing unit ("CPU") 110 are depicted as having a dedicated power rail 184. Even so, one of ordinary skill in the art will recognize that any core, sub-core, sub-unit or the like within a processing component, such as components 110, 132 182, may share a common power rail with complimentary components or have a dedicated power rail 184 and, as such, the particular architecture illustrated in FIG. 1 is exemplary in nature and will not limit the scope of the disclosure.

Returning to the FIG. 1 illustration, one or more power sensors 157 are configured to monitor power rails 184 and generate a signal indicative of power consumption by the particular component(s) associated with the power rails 184. It is envisioned that the sensors 157 may be configured to monitor current and be of a type such as, but not limited to, a Hall effect type for measuring the electromagnetic field generated by current flowing through the power rail 184, a shunt resistor current measurement type for calculating current from voltage drop measured across a resistor in the power rail 184, or any type known to one of ordinary skill in the art. As such, while the particular design, type or configuration of a sensor 157 that may be used in an embodiment of the systems and methods may be novel in, and of, itself, the systems and methods are not limited to any particular type of sensor 157. For example, even though the sensors 157 depicted in the exemplary FIG. 1 illustration are shown in association with individual power rails, it is envisioned that sensors 157 in some embodiments may be configured for measuring temperature at or near a processing component, the measurement of which may be used to deduce power consumption by a given component.

A monitor module 114 may monitor and receive the signals generated by the sensor(s) 157. The monitor module 114 may also monitor the status of instructions generated by a scheduler module 101. Notably, although the monitor module 114, concurrencies and consumption ("CC") database 24 and BCL module 26 are depicted in the FIG. 1 illustration as residing on the chip 102, one of ordinary skill in the art will recognize that any or all of components 24, 26, and 114 may reside off chip 102 in certain embodiments. Moreover, one of ordinary skill in the art will recognize that, in some embodiments of a PCD 100, the monitor module 114 and/or power sensors 157 may be included in the PMIC 180, although the particular embodiment illustrated in FIG. 1 depicts the monitor module 114 and power sensors 157 as independent components.

The BCL module 26, in conjunction with the monitor module 114 in some embodiments, may be configured to track calls for workloads from various processing components 110, 132 182. In other embodiments, the BCL module 26 may be configured to poll the battery 188 and/or PMIC 180 to determine a capacity level relative to a target current margin sought to be maintained and subsequently alert the exemplary processing components 110, 132, 182 to adjust power consumption accordingly.

As one of ordinary skill in the art will recognize, embodiments of the BCL module 26 may include hardware and/or software interrupts handled by an interrupt service routine. That is, depending on the embodiment, a BCL module 26 may be implemented in hardware as a distinct system with control outputs, such as an interrupt controller circuit, or implemented in software, such as firmware integrated into a memory subsystem. In some embodiments, workloads queued for scheduling by the scheduler module 101 may be recognized by the monitor module 114 and used as triggers for alerting the BCL module 26 to assess probable impact on battery capacity before authorizing the queued workloads to be processed. Even so, it will be understood that embodiments of the system and method are not limited to the use of workload queues as triggers for the timing of battery polling and/or capacity impact analyses and/or application of battery capacity management techniques. As such, any embodiments described herein to leverage triggers associated with workload queues are exemplary in nature and are not meant to limit the scope of a BCL module 26. For example, it is envisioned that some embodiments may leverage triggers based on one or more of user requests in the form of a graphical user interface actuation, temperature measurements at or near power consuming components, power rail measurements, etc.

Returning to the FIG. 1 illustration, the monitor module 114 monitors a signal from one or more power sensors 157 to track power consumption of active components associated with the various rails. In some embodiments, the data tracked by the monitor module 114 may be continuously updated and stored in a CC database 24 such that historical power consumption levels may be mapped to particular concurrencies. In this way, certain embodiments of a BCL module 26 may be operable to query past power consumption data and accurately determine the impact of probable concurrencies on the battery's capacity. In addition to the power sensors 157, monitor module 114 may also monitor various aspects of battery 188 including, but not limited to, real time battery discharge for power profiling loads on battery 188, predicting battery life of battery 188 and chronicling battery use. The monitor module 114 in some embodiments may also monitor depth of discharge of battery 188, state of voltage of battery 188, state of charge of battery 188 and various indicators of overall QoS and user experience of PCD 100. The monitor module 114 may subsequently communicate with the BCL module 26 and CC database 24 to relay the monitored data indicative of battery state of health and/or active power consumption within the PCD 100. Advantageously, the BCL module 26 may leverage the monitored data to quantify an active load on the battery 188 and predict the impact on that load should call(s) for additional resources be allowed. Once the active load on the battery 188 is compared to the predicted load attributable to called resources/components, the BCL module 26 may determine whether a target current margin would be encroached should the called resources be authorized to come online. In other embodiments, the active load may be leveraged to identify a capacity level for the battery that can be used by the BCL module 26 to trigger one or more active components to increase or decrease power consumption.

In some embodiments, the BCL module 26 may reference the CC database 24 for determining the probable impact on battery capacity of called components. Once the battery capacity impact of a called component is recognized by the BCL module 26, battery capacity management policies for optimizing user experience and QoS may be applied to the PCD workload.

As a non-limiting example, a user of PCD 100 including a request/grant ("R/G") BCL system may request functionality that causes scheduler module 101 to queue a workload instruction to core 0 of CPU 110. The driver for CPU 110 may then request authorization from BCL module 26 to come online and process the queued workload. The BCL module 26 may then evaluate the impact of the requested workload on battery 188. Querying CC database 24 or, in some embodiments, aggregating active power measurements from data collected by sensors 157, the BCL module 26 may quantify an active battery load in PCD 100. The BCL module 26, again querying CC database 24 for data indicative of power consumption levels associated with core 0, may quantify a probable impact on battery capacity should the requested workload instruction be processed. In the event that the additional load associated with the workload instruction to core 0 is determined to have a detrimental impact on the maintenance of a minimum current margin in battery 188, the BCL module 26 may deny the request to process the workload instruction or reduce active workloads such that the new instruction can be accommodated.

As a non-limiting example, BCL module 26 may reduce power to display 132, thereby dimming display 132 such that it consumes less power, in order to reallocate battery capacity to accommodate a call for functionality associated with RF transceiver 168 (not shown in FIG. 1). As a further example, BCL module 26 may have recognized that the activation of RF transceiver 168 to the use case active in PCD 100 would cause the voltage of battery 188 to drop below a level capable of supporting critical services (i.e., encroachment on a minimum current margin). And, as such, may have elected via implementation of a battery capacity management technique to reduce the brightness of display 132 so that battery capacity may be allocated to RF transceiver 168 without over-impacting QoS and user experience.

Notably, in some embodiments, the data in the CC database 24 may be empirically collected based on power consumption rates previously monitored in association with known use cases. In other embodiments, the data in the CC database 24 may have been calculated on an a-priori basis. In still other embodiments, the data in the CC database 24 may have been calculated on an a-priori basis and continually updated based on actual power consumption measurements monitored in PCD 100. Regardless of how the data within a CC database 24 may have been derived or collected, one of ordinary skill in the art will recognize that embodiments of a CC database 24 may be queried for evaluating actual and predicted battery capacity impacts and, beyond such function, are not limiting on the scope of the systems and embodiments disclosed.

Figure 2:
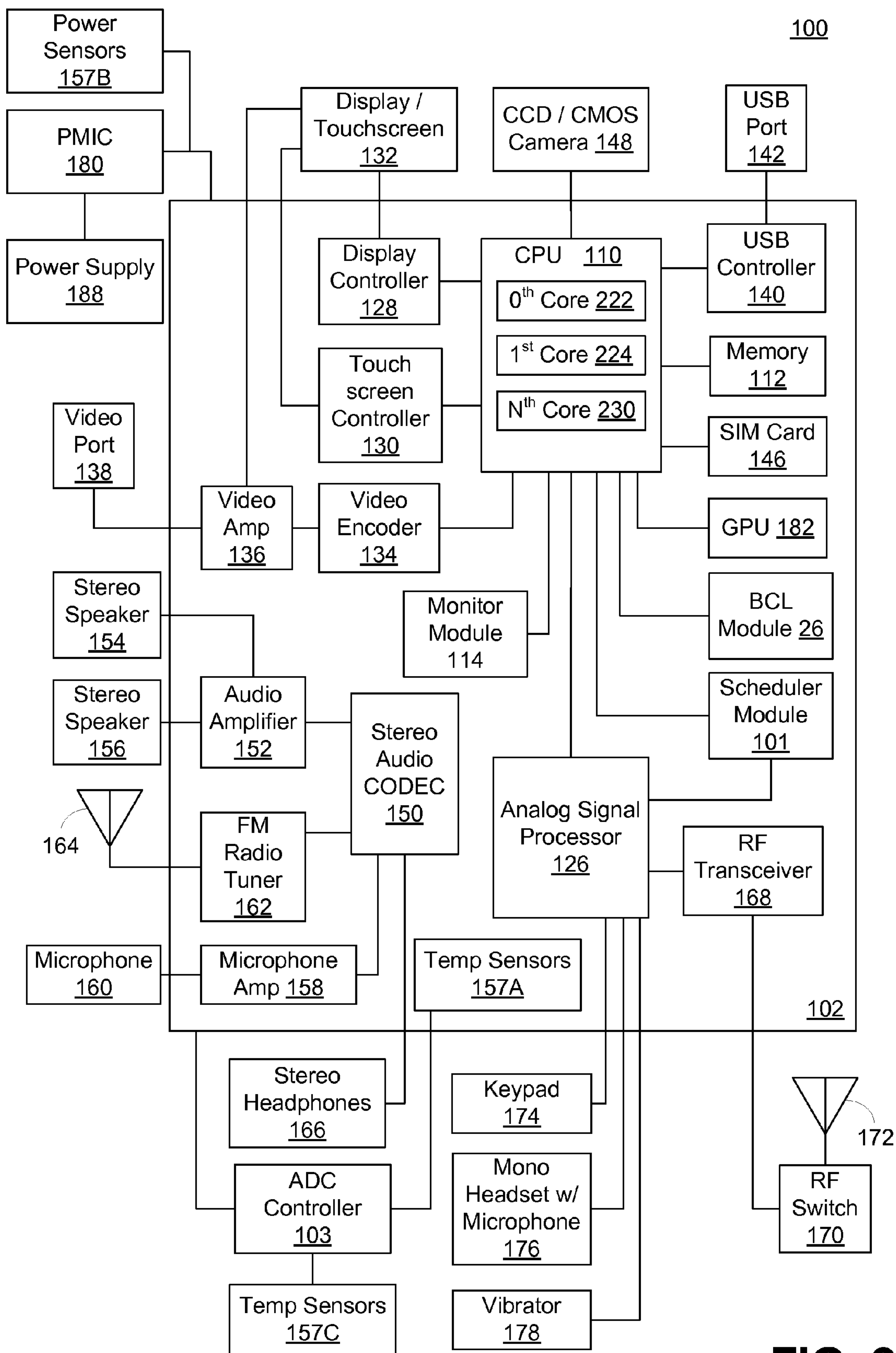
FIG. 2 is a functional block diagram of an exemplary, non-limiting aspect of a PCD in the form of a wireless telephone for implementing methods and systems for dynamically managing battery capacity to optimize QoS and overall user experience.

FIG. 2 is a functional block diagram of an exemplary, non-limiting aspect of a PCD 100 in the form of a wireless telephone for implementing methods and systems for dynamically managing battery capacity to optimize QoS and overall user experience. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the battery current limiting ("BCL") module 26, in conjunction with the monitor module 114, may be responsible for monitoring battery loads, predicting impacts on battery capacities and applying battery capacity management techniques to help a PCD 100 optimize its power supply and maintain a high level of functionality. In some embodiments, the BCL module may utilize a reactive loop algorithm that adjusts a target current margin level in the battery based on identification of the highest consuming component block not active. In other embodiments, the BCL module may seek to maintain a target current margin by authorizing requesting components to come online at reduced power levels and/or dictating that active components decrease or increase power consumption.

The monitor module 114 communicates with multiple operational sensors (e.g., thermal sensors 157A) distributed throughout the on-chip system 102 and with the CPU 110 of the PCD 100 as well as with the BCL module 26. In some embodiments, monitor module 114 may also monitor power sensors 157B for power consumption rates uniquely associated with the cores 222, 224, 230 and transmit the power consumption data to the BCL module 26 and/or CC database 24 (which may reside in memory 112). The BCL module 26 may work with the monitor module 114 to identify probable concurrencies that may warrant application of one or more battery capacity management techniques to identified components within chip 102.

As illustrated in FIG. 2, a display controller 128 and a touch screen controller 130 are coupled to the digital signal processor 110. A touch screen display 132 external to the on-chip system 102 is coupled to the display controller 128 and the touch screen controller 130. A BCL module 26 may monitor workload queues for the cores 222, 224, 230, for example, and work with PMIC 180 to manage power provided to the cores from power supply 188. The monitor module 114 may monitor current measurements on power rails from the PMIC 180 to components of the on-chip system 102 and provide those measurements to BCL module 26 for calculation of active battery loads. Advantageously, by quantifying active power loads the BCL module 26 may predict the impact on battery capacity resulting from calls for additional functionality/workloads on one or more components within PCD 100.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 2, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the analog signal processor 126. An RF switch 170 may be coupled to the RF transceiver 168 and an RF antenna 172. As shown in FIG. 2, a keypad 174 may be coupled to the analog signal processor 126. Also, a mono headset with a microphone 176 may be coupled to the analog signal processor 126. Further, a vibrator device 178 may be coupled to the analog signal processor 126. FIG. 2 also shows that a power supply 188, for example a battery, is coupled to the on-chip system 102 through PMIC 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157C may produce a voltage drop that is converted to digital signals with an analog-to-digital converter ("ADC") controller 103. However, other types of thermal sensors 157A, 157C may be employed without departing from the scope of the invention.

The BCL module(s) 26 may comprise software which is executed by the CPU 110. However, the BCL module(s) 26 may also be formed from hardware and/or firmware without departing from the scope of the invention. The BCL module(s) 26 may be responsible for monitoring and applying battery capacity policies that include one or more battery capacity management techniques that may help a PCD 100 avoid overburdening its power supply while maintaining a high level of functionality and user experience.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more BCL module(s) 26. These instructions that form the BCL module(s) 26 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 3:
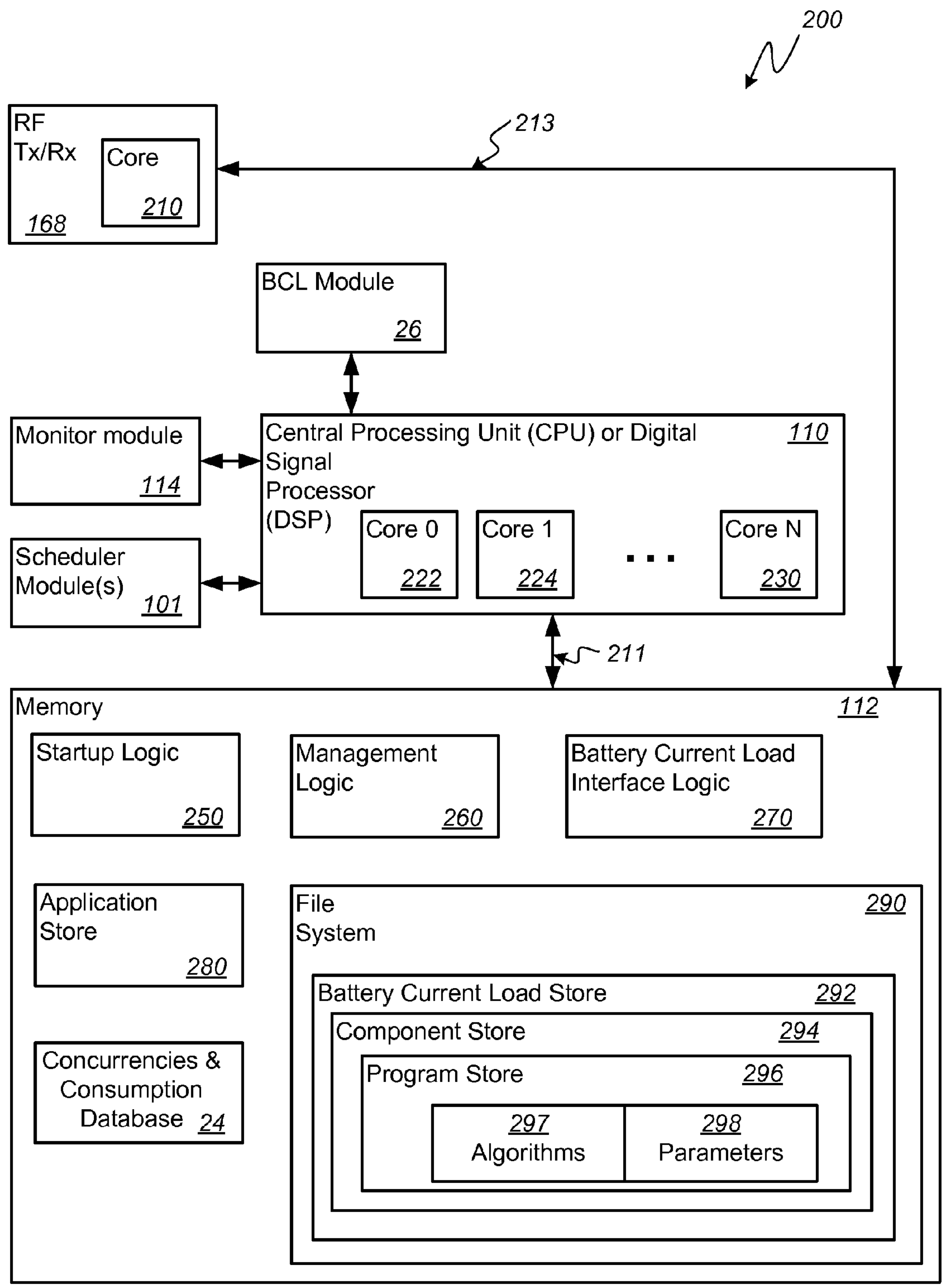
FIG. 3 is a schematic diagram illustrating an exemplary software architecture of the PCD of FIG. 2 for supporting battery load monitoring and application of algorithms associated with dynamic battery capacity management techniques.

FIG. 3 is a schematic diagram illustrating an exemplary software architecture of the PCD of FIG. 2 for supporting battery load monitoring and application of algorithms associated with dynamic battery capacity management techniques. Any number of algorithms may form or be part of at least one battery capacity management technique that may be applied by the BCL module 26 when certain load conditions or use case scenarios are met and additional functionality or resources are called into execution.

As illustrated in FIG. 3, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs may be distributed for processing across two or more of the available cores. Notably, although the execution of battery capacity management techniques in the family of R/G methodologies are described relative to the FIG. 3 illustration in connection with executing, scaling or killing workloads running on CPU 110 or core 210, one of ordinary skill in the art will recognize that application of such techniques may advantageously execute, scale or kill workloads on any component within PCD 100 that contributes to an aggregate battery load on battery 188. Moreover, one of ordinary skill in the art will recognize that a similar software architecture may be employed by embodiments that utilize a reactive loop methodology and, as such, the description of the FIG. 3 illustration in the context of a R/G embodiment will not limit the scope of this disclosure.

The CPU 110 may receive commands from the BCL module(s) 26 that may comprise software and/or hardware. If embodied as software, the BCL module 26 comprises instructions that are executed by the CPU 110 that issues commands to other application programs being executed by the CPU 110 and other processors. For example, the BCL module 26 may instruct CPU 110 to cause a certain active application program to cease so that excess battery capacity may be allocated to serve a user's call for alternative functionality.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

In the illustrated embodiment, the RF transceiver 168 is implemented via digital circuit elements and includes at least one processor such as the core processor 210 (labeled "Core"). In this digital implementation, the RF transceiver 168 is coupled to the memory 112 via bus 213. Returning to the example above, a BCL module 26 seeking to accommodate a user's call for functionality may cause CPU 110 to instruct core 210 to shut down RF transceiver 168. Advantageously, by doing so, the BCL module 26 may be able to accommodate a call for functionality that otherwise could not have been supported by the power source 188 without encroaching a target current margin.

Each of the bus 211 and the bus 213 may include multiple communication paths via one or more wired or wireless connections, as is known in the art. The bus 211 and the bus 213 may have additional elements, which are omitted for simplicity, such as controllers, buffers (caches), drivers, repeaters, and receivers, to enable communications. Further, the bus 211 and the bus 213 may include address, control, and/or data connections to enable appropriate communications among the aforementioned components.

When the logic used by the PCD 100 is implemented in software, as is shown in FIG. 3, it should be noted that one or more of startup logic 250, management logic 260, battery current limiting interface logic 270, applications in application store 280, data associated with CC database 24 and portions of the file system 290 may be stored on any computer-readable medium for use by or in connection with any computer-related system or method.

In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that may fetch the instructions from the instruction execution system, apparatus, or device and execute the instructions. In the context of this document, a "computer-readable medium" may be any means that can store, communicate, propagate, or transport the program for use by or in connection with the instruction execution system, apparatus, or device.

The computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program may be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the battery current limiting interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor and or the core 210 (or additional processor cores) in the RF transceiver 168.

In one exemplary embodiment for monitoring and managing battery capacities to maintain target current margins and optimize user experience and QoS, the startup logic 250 includes one or more executable instructions for selectively identifying, loading, and executing a select program for managing battery loads of one or more of the available components in PCD 100 such as the first core 222, the second core 224 through to the N$^{th}$ core 230. A select program may be found in the program store 296 of the embedded file system 290 and is defined by a specific combination of a performance scaling algorithm 297 and a set of parameters 298. The select program, when executed by one or more of the core processors in the CPU 110 and the core 210 in the RF transceiver 168, may operate in accordance with one or more signals provided by the monitor module 114 in combination with control signals provided by the one or more BCL module(s) 101 to scale or suspend the performance of the respective processor core in an effort to mitigate demand on the battery 188 and guarantee maintenance of a target current margin.

The management logic 260 includes one or more executable instructions for terminating a battery capacity management program on one or more of the respective processor cores, as well as selectively identifying, loading, and executing a more suitable replacement program for managing or controlling the power draw of one or more of the available cores based on an updated battery capacity level. The management logic 260 is arranged to perform these functions at run time or while the PCD 100 is powered and in use by an operator of the device. A replacement program may be found in the program store 296 of the embedded file system 290.

The replacement program, when executed by one or more of the core processors in the digital signal processor or the core 210 in the RF transceiver 168, may operate in accordance with one or more signals provided by the monitor module 114 or one or more signals provided on the respective control inputs of the various processor cores to scale or suspend the performance of the respective processor core. In this regard, the monitor module 114 may provide one or more indicators of events, processes, applications, resource status conditions, elapsed time, temperature, current leakage, etc in response to control signals originating from the BCL module 26.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all performance scaling in the RF transceiver 168 when the received signal power falls below an identified threshold. By way of further example, the inputs may include a change to the management logic 260 that instructs the PCD 100 to apply a desired program when the video codec 134 is active. As another non-limiting example, the inputs may include data in CC database 24 associated with individual component performance such as, but not limited to, battery demand, average battery load, peak battery load, etc.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280, data in the CC database 24 or information in the embedded file system 290 may be edited, replaced, or otherwise modified. In some embodiments, the interface logic 270 may permit an end user or operator of the PCD 100 to search, locate, modify or replace the startup logic 250, the management logic 260, applications in the application store 280, data in the CC database 24 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged battery current limiting store 292. In this regard, the file system 290 may include a reserved section of its total file system capacity for the storage of information for the configuration and management of the various parameters 298 and battery capacity management algorithms 297 used by the PCD 100. As shown in FIG. 3, the store 292 includes a component store 294, which includes a program store 296, which includes one or more battery capacity management programs.

Figure 4:
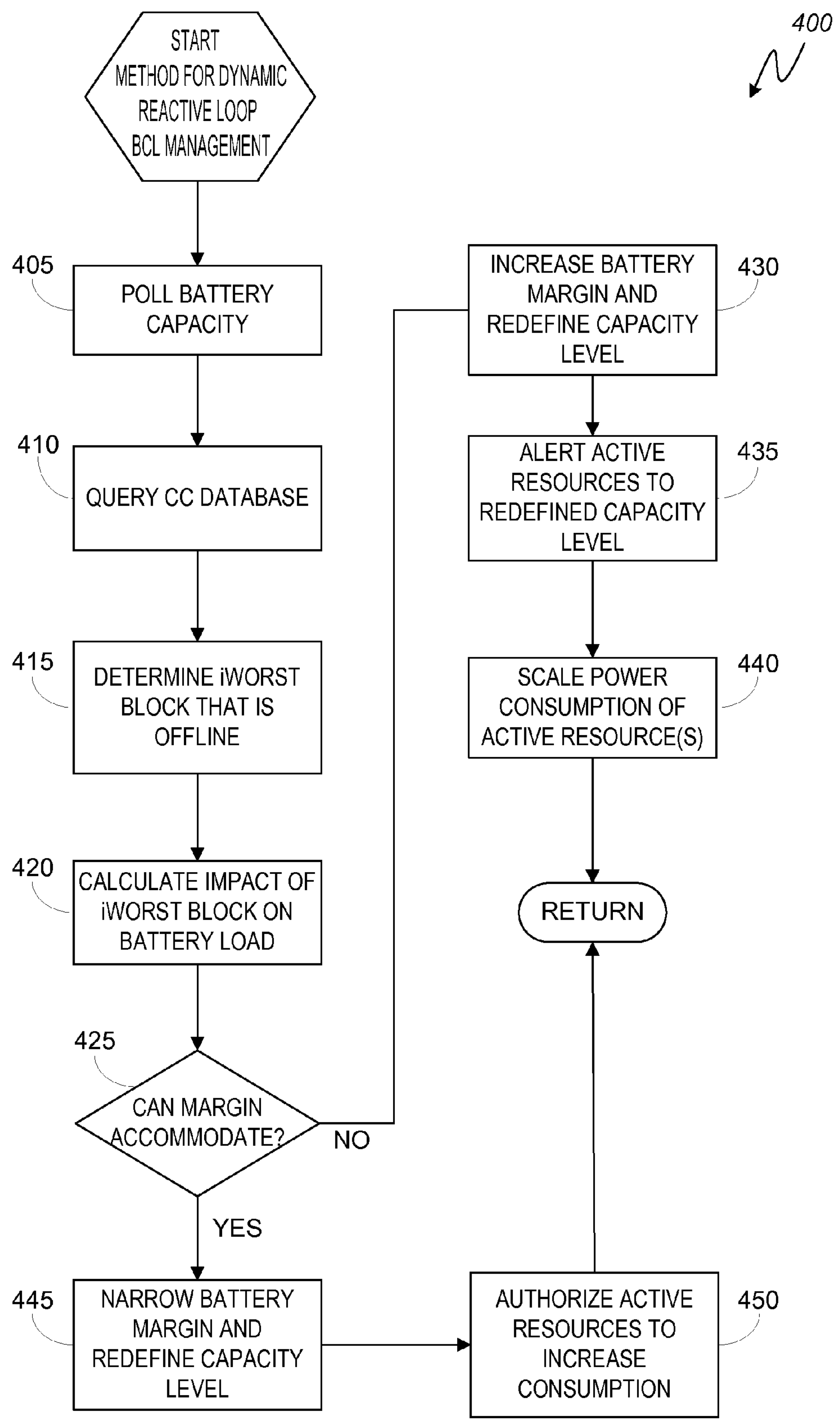
FIG. 4 is a logical flowchart illustrating a method of a reactive loop type for dynamic management of battery capacity in a PCD.

FIG. 4 is a logical flowchart illustrating a method 400 of a reactive loop type for dynamic management of battery capacity in a PCD 100. As explained above, systems and methods for dynamic management of battery capacity that leverage reactive loop methodologies rely on periodic polling to determine the state of the battery 188. That is, in most reactive loop embodiments the battery 188 is polled on a regular basis and the level of excess capacity available to active resources is redefined without regard for queued workloads.

Beginning at block 405, the battery 188 is polled by the BCL module 26 (and/or the monitor module 114) to determine its instantaneous available capacity relative to a target safety margin to be maintained as well as identify the active components drawing on the battery's resources. Notably, it is envisioned that polling the battery 188 may also include, but is not limited to including, determining the battery's active load, state of voltage, aggregate current draw, etc.

At block 410, the BCL module 26 queries concurrencies and power consumption ("CC") database 24 to identify, based on the active components, which offline components are likely to be called to provide additional functionality concurrently with the active components. For instance, if at block 405 it was determined that the display 132 and the speakers 154, 156 were active components drawing on the resources of the battery 188, then a query of the CC database 24 by the BCL module 26 may identify any number of offline components that are likely to be called to provide functionality concurrently with display 132 and speakers 154, 156. As a non-limiting example, the BCL module 26 may identify from the query that when the display 132 and speakers 154, 156 are active, it is likely that a processing core dedicated to gaming applications will be called to come online concurrently as well as the touch screen controller 130 for providing a user interface to the gaming application.

Based on the identification of likely concurrencies, i.e. identification of which offline components are likely to be called to provide functionality concurrently with the active components, the BCL module 26 at block 415 determines from the query which offline component, or combination of offline components, represents the largest potential consumer of power (the "iWORST" block of components). So, returning to the non-limiting example above, the BCL module 26 may determine at block 415 that the iWORST block of offline components consists of the exemplary gaming processing core and the touch screen controller 130.

Once the iWORST block of offline components is determined at block 415, at block 420 the BCL module 26 calculates the impact that the iWORST block would have on the active battery load in the event that the iWORST block is called to come online. Notably, the potential impact of the iWORST block coming online may exceed a target current margin or, in other cases, the target current margin may be larger than required to accommodate the iWORST block.

For instance, suppose that a target current margin is set to be maintained at 10% of battery capacity and the active load on the battery at the time of polling is 90%. In such case, the BCL module 26 may recognize that there is the 10% battery current margin available to accommodate bringing online additional components. So, if the iWORST block of offline components, such as the gaming applications core and touch screen controller 130 in the example above, would require 12% of the battery's capacity, then the BCL module 26 may determine that the target current margin be increased from 10% to 12% to ensure that the iWORST block could be accommodated if called online. Notably, as one of ordinary skill in the art would recognize in such a case, increasing the target current margin from 10% to 12% effectively reduces the level of capacity available to active resources from 90% to 88%. Similarly, if the iWORST block of components would require only 8% of the battery's capacity, then the BCL module 26 may determine that the target margin be reduced to 8%, thereby increasing the level of capacity available to active components from 90% to 92%. In this way, the target current margin may be dynamically managed to optimize the allocation of battery capacity to active resources, thereby benefitting QoS and user experience.

Returning to method 400, at decision block 425 the potential impact calculated at block 420 is analyzed to determine whether it could be accommodated by the target current margin. If bringing the iWORST block of components online would cause the target current margin to be exceeded, then the "no" branch is followed to block 430. At block 430, the target current margin is increased to guarantee that the iWORST block of components could be accommodated if brought online and the level of capacity available to active components is decreased accordingly. At block 435 the active components are alerted to the change in the level of available capacity. At block 440 the BCL module 26 works with the components to scale power consumption according to the newly defined level of capacity.

If at decision block 425 it is determined that the target current margin exceeds the amount of battery capacity needed to accommodate the iWORST block of components, then the "yes" branch is followed to block 445. At block 445 the target current margin is narrowed to match the amount of capacity associated with the iWORST block and the level of capacity available to the active components is redefined to a higher level. At block 450, the BCL module 26 alerts the active components to the newly increased level of capacity available and authorizes increased power consumption, if needed by one or more components.

The method 400 has been described in the context of a battery 188 having an initial target current margin of 10% with the remaining 90% capacity being utilized in full by those components which represent an active demand on the battery resource. It is envisioned, however, that a target current margin may be dynamically adjusted to the level of the iWORST block of components while the remaining capacity allocated to active components is only utilized in part.

For instance, suppose that the target current margin is set to 10% and the active components represent an aggregate demand of 70% of the battery capacity. In such a case, the BCL module 26 may recognize that there is 20% excess capacity available to the active components and the dynamic adjustment of the target current margin based on the iWORST block would effectively increase or decrease the level of excess capacity available. Under such a scenario, the BCL module 26 would alert the active components to changes in the excess capacity available and authorize them to increase consumption if warranted. In this way, it is envisioned that in some scenarios the active components may, or may not, increase or decrease power consumption as a result of an adjustment in the target current margin. As a non-limiting example, a thermal management policy may dictate that a given component remain at a lower level of power consumption even though the BCL module 26 has authorized an increase in consumption.

Figure 5:
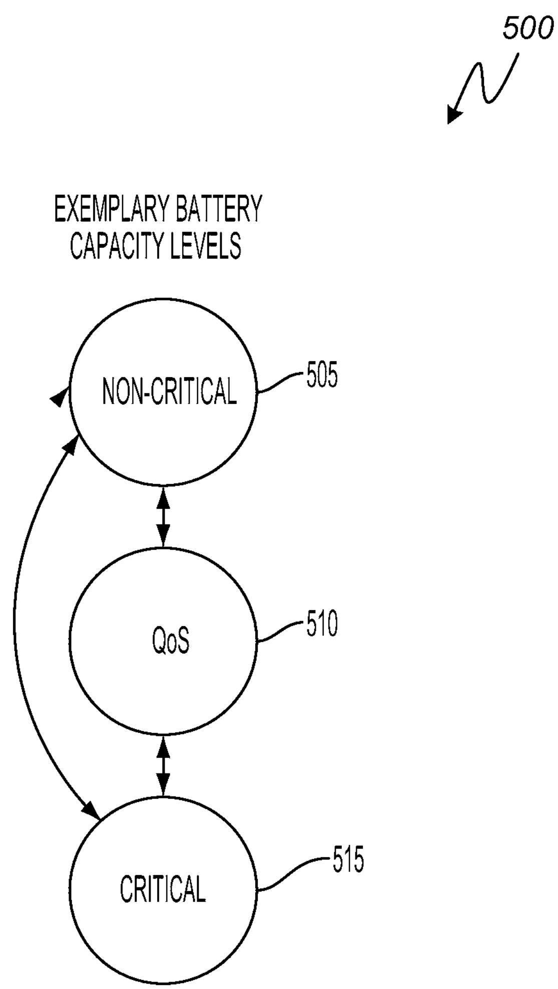
FIG. 5 is an exemplary state diagram that illustrates various battery capacity levels that may be recognized and managed to optimize QoS and overall user experience.

FIG. 5 is an exemplary state diagram 500 that illustrates various battery capacity levels 505, 510, and 515 that may be recognized and managed by the BCL module 26 in conjunction with the monitoring module 114. The first battery capacity level 505 may comprise a "non-critical" level in which the amount of capacity available to the active components outside of the target current margin is not being completely utilized. At this exemplary level, the aggregate battery load may be well under the portion of the capacity of the battery 188 that is earmarked for active resources. As such, an increase or decrease in the target current margin by the BCL module 26 may only increase or decrease the amount of excess capacity already available to the active components without necessitating that the active components reduce their rate(s) of power consumption.

The second battery capacity level 510 may comprise a "quality of service" or "QoS" level in which the active components are fully consuming the portion of battery capacity available to them and a change in the target current margin effectively increases the amount available. For instance, returning to the exemplary scenario outlined above, suppose that a target current margin is set to be maintained at 10% of battery capacity and the active components within the PCD 100 are fully utilizing the remaining 90% capacity. The BCL module 26 determines that the power consumption level associated with the iWORST offline block of components has decreased and adjusts the target current margin from 10% to 8%, thereby effectively increasing the capacity available to the active components from 90% to 92% of the total battery 188 capacity. The BCL module 26 alerts the active components to the additional 2% of capacity made available via the adjustment of the target current margin. The active components, having been alerted to the QoS capacity level, may increase power consumption by the 2% provide an improved QoS and user experience.

The third battery capacity level 515 may comprise a "critical" capacity level in which the active components are fully consuming the portion of the battery capacity earmarked for active components and the BCL module 26 effectively reduces the capacity available to active components by increasing the target current margin. The BCL module 26, having increased the target current margin and recognizing from its poll of the battery 188 that the amount of capacity being actively consumed must be decreased, alerts the active components of the critical capacity level. The active components subsequently scale power consumption in order to avoid encroachment into the newly increased target current margin. Under such a scenario, one of ordinary skill in the art will recognize that the QoS and user experience of the PCD 100 may suffer as the processing speeds of the various active components are reduced.

FIG. 6 is a diagram 600 illustrating exemplary battery capacity management techniques that may be dictated by a BCL module 26 to optimize QoS and overall user experience and are dependent upon a particular battery capacity level of a PCD 100. As noted previously, in this first battery capacity level 505, the active components in the PCD 100 may be creating a demand that is significantly less than the portion of the battery capacity available for active consumption (total capacity−target current margin=capacity available for active consumption). The BCL module 26, having polled the battery 188, may recognize that an increase or decrease in the target current margin will not necessitate a change in the power consumption of the active components because the active components are presently consuming significantly less than the portion of capacity available to them. Nonetheless, the BCL module 26 may alert the active components of a change in the available capacity, the change having been the result of an adjustment in the target current margin. Even so, the level of QoS being provided by the active components may stay constant as other policies being applied to the components dictate no change in the power consumption levels.

In the second battery capacity level 510, the BCL module 26 may have recognized from the poll of the battery 188 that the active components are consuming all, or near all, of the battery capacity available to them. As such, a decrease in the target current margin may increase the available capacity for active components. The BCL module 26, after having decreased the target current margin, may alert the active components to the increased availability of battery capacity for active consumption. Notably, because the active components are consuming all or nearly all of the capacity made available for active consumption, an increase in available capacity resulting from a decrease in the target current margin may provide an opportunity for improved QoS as the various components take advantage of the new capacity level and increase their processing speeds.

In the third battery capacity level 515, the BCL module 26 may have recognized from the poll of the battery 188 that the active components are consuming all, or near all, of the battery capacity available to them. As such, an increase in the target current margin may decrease the available capacity for active components. The BCL module 26, after having increased the target current margin, may have created a situation where the ongoing power consumption by the active components encroaches the adjusted target current margin. Recognizing that the battery capacity level 515 is of a critical nature, the BCL module 26 may alert the active components to the decreased availability of battery capacity for active consumption and dictate that one or more components scale its processing speed. Notably, because the active components are consuming all or nearly all of the capacity made available for active consumption, a decrease in available capacity resulting from an increase in the target current margin may necessitate a noticeable degradation in QoS as the various components adjust to the new battery capacity level by scaling processing speeds.

Figure 7:
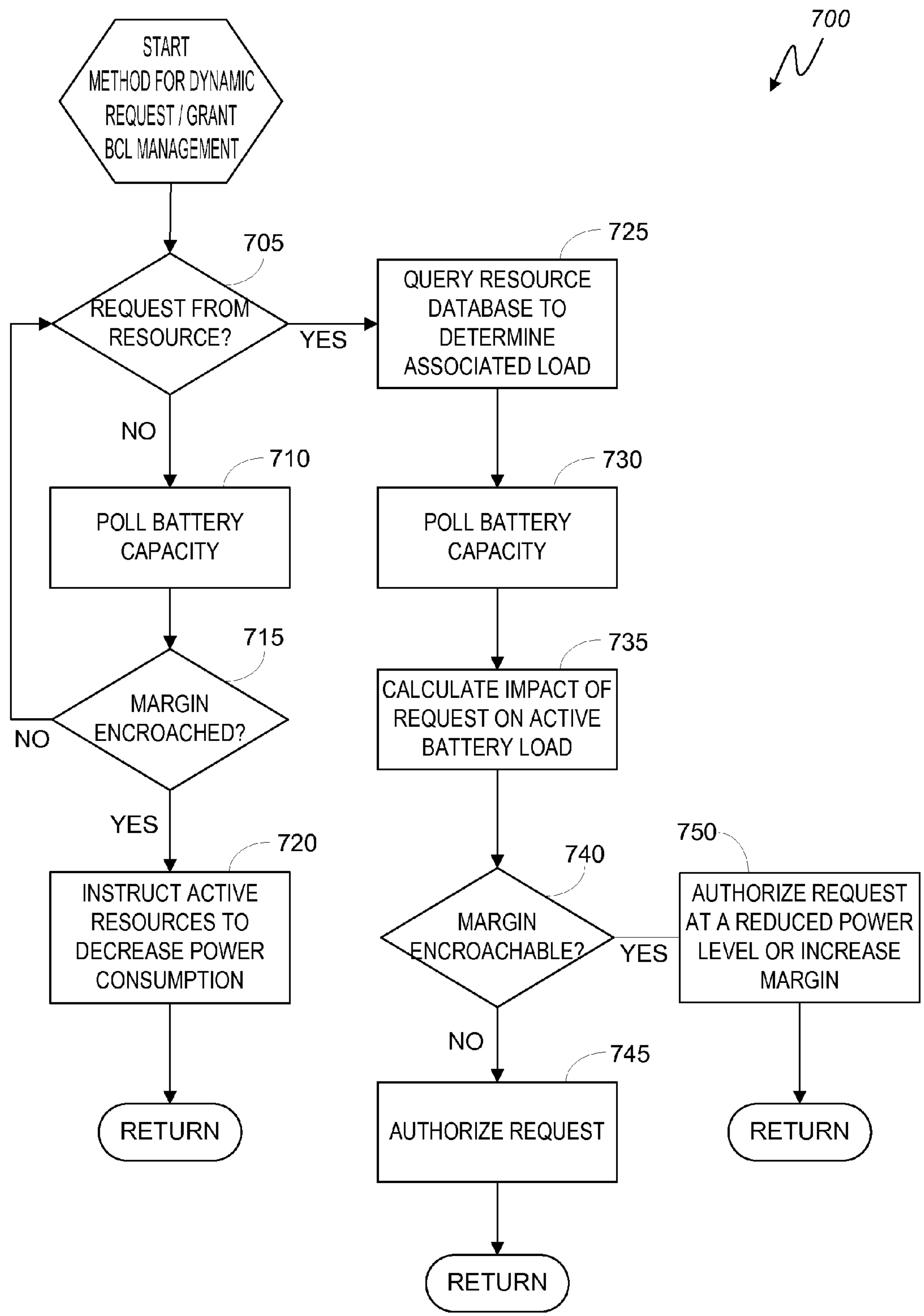
FIG. 7 is a logical flowchart illustrating a method of a request/grant type for dynamic management of battery capacity in a PCD.

FIG. 7 is a logical flowchart illustrating a method 700 of a request/grant type for dynamic management of battery capacity in a PCD 100. Method 700 starts with a first decision block 705 in which the BCL module 26 receives a request from an offline resource to come online. As one of ordinary skill in the art will recognize, the request to come online may be the result of a user's call for additional functionality. As a non-limiting example, reconsider the illustration above where the display 132 and speakers 154, 156 are active consumers of battery capacity and a user calls for a gaming application to come online. In order to provide the gaming function, a processing core dedicated to game workloads and the touch screen controller 130 may request authorization from the BCL module 26 to come online.

Returning to the method 700, if no request is recognized at decision block 705, the BCL module 26 and/or monitor module 114 may poll the battery at block 710. As described above, the task of polling the battery may include any measurement useful for quantifying demand on the battery and/or available capacity such as, but not limited to, state of charge, voltage levels, discharge rates, etc. In polling the battery 188, the BCL module compares the active demand on the battery with the capacity available for active consumption (total battery capacity−target current margin=capacity available for active consumption). If at decision block 715 it is determined that the active demand on the battery does not exceed the capacity available for active consumption, i.e. the active demand does not encroach upon the target current margin to be maintained as a set aside to accommodate additional resources that may request to come online, then the "no" branch is followed back to decision block 705. If, however, it is determined at decision block 715 that the active demand on the battery 188 has caused the target current margin to be encroached, then the "yes" branch is followed to block 720 and the BCL module 26 instructs one or more of the active components to decrease its power consumption. Advantageously, by instructing one or more of the active components to decrease its power consumption, the BCL module 26 may cause the target current margin to be recovered.

Returning to decision block 705, if a request from an offline resource to come online is recognized by the BCL module 26, such as the exemplary gaming core and touch screen controller 130 in the illustration above, then the "yes" branch is followed to block 725. At block 725, the CC database 24 is queried by the BCL module 26 to determine the power load associated with the requesting component(s). Notably, it is envisioned that in some embodiments the CC database 24 may be queried directly by the individual software drivers that are managing each requesting component rather than utilizing a central BCL module 26—i.e., it is envisioned that the BCL module 26, or aspects thereof, may be distributed across and associated with various drivers of requesting components. At block 730 the battery is polled to determine the active demand and available capacity level, if any. At block 735, the impact that the queried power load associated with the requesting component(s) will have on the battery capacity is calculated.

If at decision block 740 it is determined by the BCL module 26 that authorizing the requesting component(s) to come online will not cause the target current margin to be encroached, i.e. there is enough unused capacity in excess of the target current margin to accommodate the demand of the requesting component(s), then at block 745 the requesting component(s) are given authorization to come online. Returning to decision block 740, if it is determined by the BCL module 26 that authorizing the requesting component(s) to come online will cause the target current margin to be encroached, i.e. there is not enough unused capacity in excess of the target current margin to accommodate the demand of the requesting component(s), then at block 750 the requesting component(s) may be given authorization to come online at a reduced power level. Alternatively at block 750, the BCL module 26 may instruct active components to decrease power consumption in order to generate enough capacity such that the requesting component(s) may come online at a given power level without causing the target current margin to be encroached.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing battery capacity in a portable computing device ("PCD"), the method comprising:

polling a battery in the PCD to determine an active demand on its capacity, wherein the active demand is associated with an aggregate power consumption of one or more online components within the PCD;

recognizing a request from one or more offline components within the PCD to come online;

querying a database to identify a power consumption associated with the one or more offline components wherein the identified power consumption is based on historical power consumption of the requesting one or more offline components when concurrently active with a set of components comprising the requesting one or more offline components and one or more additional components;

calculating a future active demand on the battery that would result from an authorization for the offline components to come online, wherein the future active demand is calculated based on the aggregate power consumption of the one or more online components and the power consumption associated with the one or more offline components;

determining whether the future active demand would cause a target current margin to be encroached, wherein the target current margin corresponds to a portion of the battery capacity held in reserve;

based on determining whether the future active demand would cause a target current margin to be encroached, responding to the request of the one or more offline components to come online, wherein:

if the future active demand would not cause the target current margin to be encroached, responding to the request of the one or more offline components comprises authorizing the one or more offline components to come online; and if the future active demand would cause the target current margin to be encroached, responding to the request of the one or more offline components comprises authorizing the one or more offline components to come online at a reduced power level; and re-polling the battery in the PCD to determine an updated active demand on its capacity, wherein:

if the updated active demand does not encroach the target current margin, authorizing one or more online components to increase power consumption.

2. The method of claim 1 further comprising dictating that one or more online components reduce power consumption if the future active demand would cause the target current margin to be encroached.

3. A computer system for managing battery capacity in a portable computing device ("PCD"), the system comprising:

a monitor module configured for:

polling a battery in the PCD to determine an active demand on its capacity, wherein the active demand is associated with an aggregate power consumption of one or more online components within the PCD; and a battery current limiting ("BCL") module configured for:

recognizing a request from one or more offline components within the PCD to come online;

querying a database to identify a power consumption associated with the one or more offline components wherein the identified power consumption is based on historical power consumption of the requesting one or more offline components when concurrently active with a set of components comprising the requesting one or more offline components and one or more additional components;

calculating a future active demand on the battery that would result from an authorization for the offline components to come online, wherein the future active demand is calculated based on the aggregate power consumption of the one or more online components and the power consumption associated with the one or more offline components;

determining whether the future active demand would cause a target current margin to be encroached, wherein the target current margin corresponds to a portion of the battery capacity held in reserve;

based on determining whether the future active demand would cause a target current margin to be encroached, responding to the request of the one or more offline components to come online, wherein:

if the future active demand would not cause the target current margin to be encroached, responding to the request of the one or more offline components comprises authorizing the one or more offline components to come online; and if the future active demand would cause the target current margin to be encroached, responding to the request of the one or more offline components comprises authorizing the one or more offline components to come online at a reduced power level; and re-polling the battery in the PCD to determine an updated active demand on its capacity, wherein:

if the updated active demand does not encroach the target current margin, authorizing one or more online components to increase power consumption.

4. The computer system of claim 3, the BCL module further configured for dictating that one or more online components reduce power consumption if the future active demand would cause the target current margin to be encroached.

5. A computer system for managing battery capacity in a portable computing device ("PCD"), the system comprising:

means for polling a battery in the PCD to determine an active demand on its capacity, wherein the active demand is associated with an aggregate power consumption of one or more online components within the PCD;

means for recognizing a request from one or more offline components within the PCD to come online;

means for querying a database to identify a power consumption associated with the one or more offline components wherein the identified power consumption is based on historical power consumption of the requesting one or more offline components when concurrently active with a set of components comprising the requesting one or more offline components and one or more additional components;

means for calculating a future active demand on the battery that would result from an authorization for the offline components to come online, wherein the future active demand is calculated based on the aggregate power consumption of the one or more online components and the power consumption associated with the one or more offline components;

means for determining whether the future active demand would cause a target current margin to be encroached, wherein the target current margin corresponds to a portion of the battery capacity held in reserve;

based on determining whether the future active demand would cause a target current margin to be encroached, means for responding to the request of the one or more offline components to come online, wherein:

if the future active demand would not cause the target current margin to be encroached, responding to the request of the one or more offline components comprises authorizing the one or more offline components to come online; and if the future active demand would cause the target current margin to be encroached, responding to the request of the one or more offline components comprises authorizing the one or more offline components to come online at a reduced power level; and means for re-polling the battery in the PCD to determine an updated active demand on its capacity, wherein:

if the updated active demand does not encroach the target current margin, authorizing one or more online components to increase power consumption.

6. The computer system of claim 5 further comprising means for dictating that one or more online components reduce power consumption if the future active demand would cause the target current margin to be encroached.

7. A computer program product comprising a non-transitory computer usable medium having a computer readable program code embodied therein, said computer readable program code adapted to be executed to implement a method for managing battery capacity in a portable computing device ("PCD"), said method comprising:

polling a battery in the PCD to determine an active demand on its capacity, wherein the active demand is associated with an aggregate power consumption of one or more online components within the PCD;

recognizing a request from one or more offline components within the PCD to come online;

querying a database to identify a power consumption associated with the one or more offline components wherein the identified power consumption is based on historical power consumption of the requesting one or more offline components when concurrently active with a set of components comprising the requesting one or more offline components and one or more additional components;

calculating a future active demand on the battery that would result from an authorization for the offline components to come online, wherein the future active demand is calculated based on the aggregate power consumption of the one or more online components and the power consumption associated with the one or more offline components;

determining whether the future active demand would cause a target current margin to be encroached, wherein the target current margin corresponds to a portion of the battery capacity held in reserve;

based on determining whether the future active demand would cause a target current margin to be encroached, responding to the request of the one or more offline components to come online, wherein:

if the future active demand would not cause the target current margin to be encroached, responding to the request of the one or more offline components comprises authorizing the one or more offline components to come online; and if the future active demand would cause the target current margin to be encroached, responding to the request of the one or more offline components comprises authorizing the one or more offline components to come online at a reduced power level; and re-polling the battery in the PCD to determine an updated active demand on its capacity, wherein:

if the updated active demand does not encroach the target current margin, authorizing one or more online components to increase power consumption.

8. The computer program product of claim 7, the method further comprising dictating that one or more online components reduce power consumption if the future active demand would cause the target current margin to be encroached.

* * * * *